March 21, 1967 H. R. FALKEN 3,309,948
WIRE CUTTING AND STRIPPING APPARATUS ADJUSTABLE
FOR SIZES AND LENGTHS OF WIRE TO BE STRIPPED
Filed Jan. 10, 1966 4 Sheets-Sheet 1
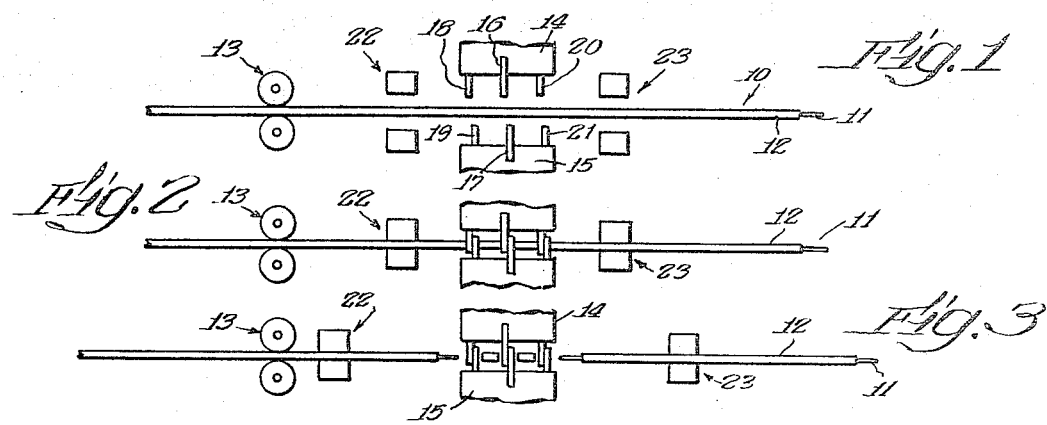
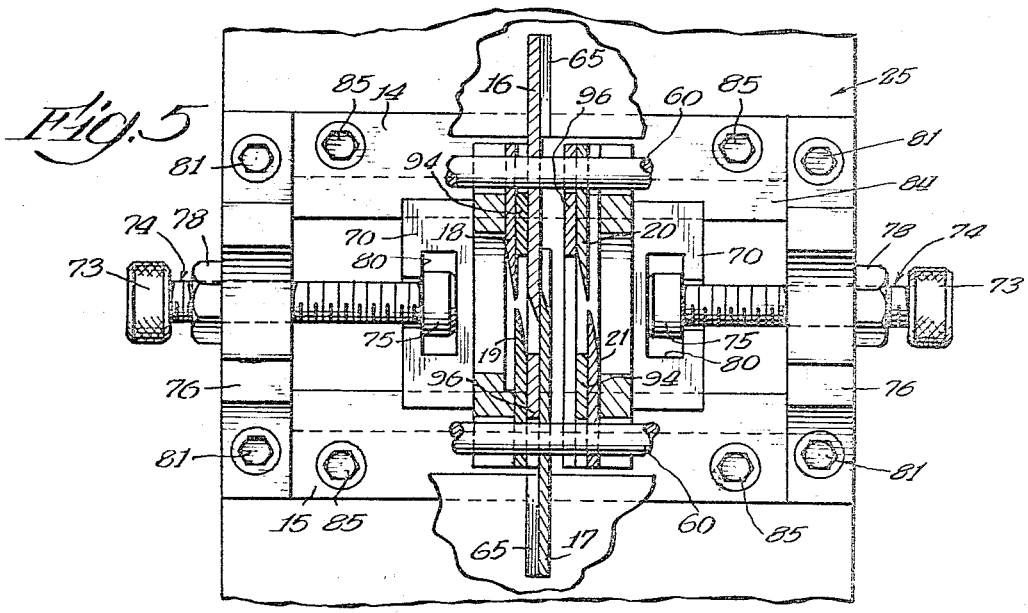
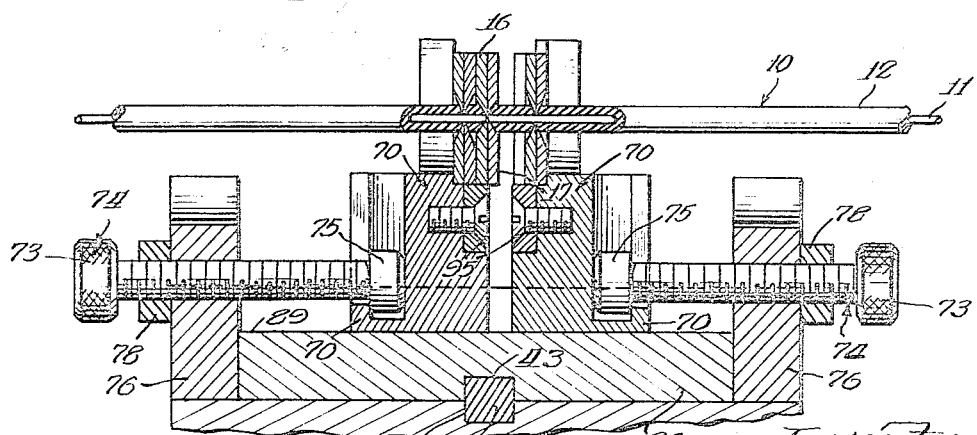
Inventor:
HENRY R. FALKEN
By Bair, Freeman & Molinare
Attys

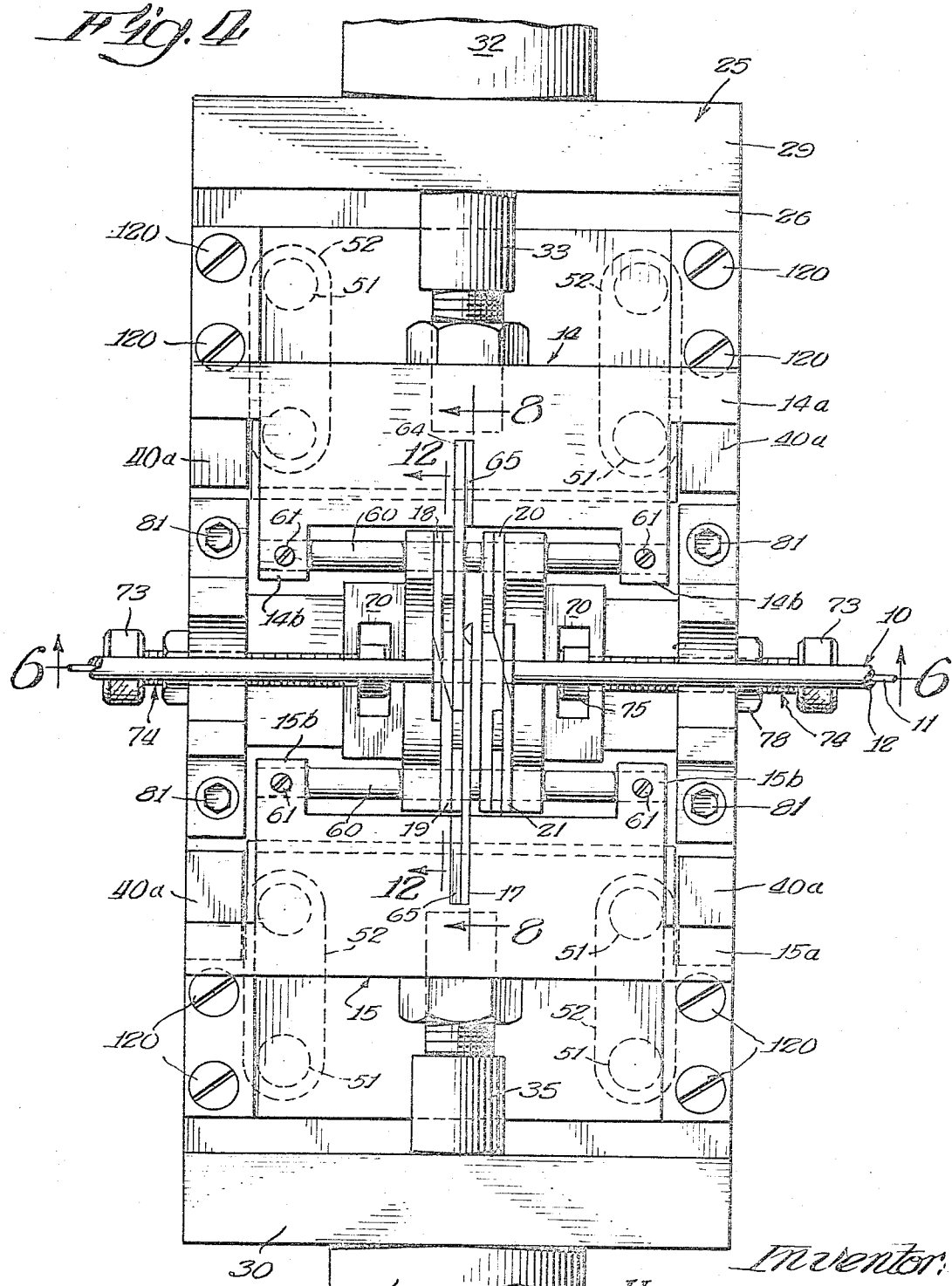

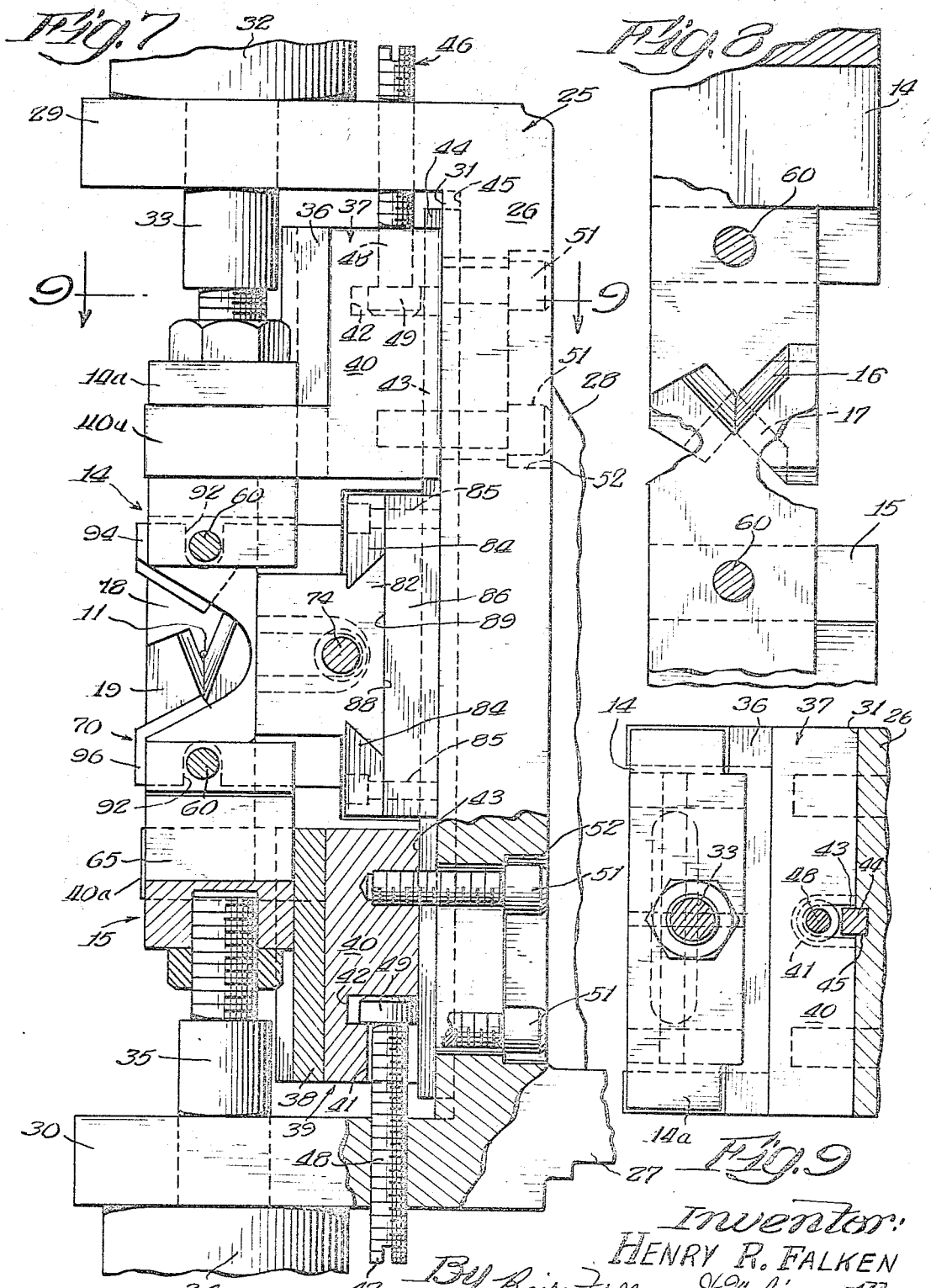

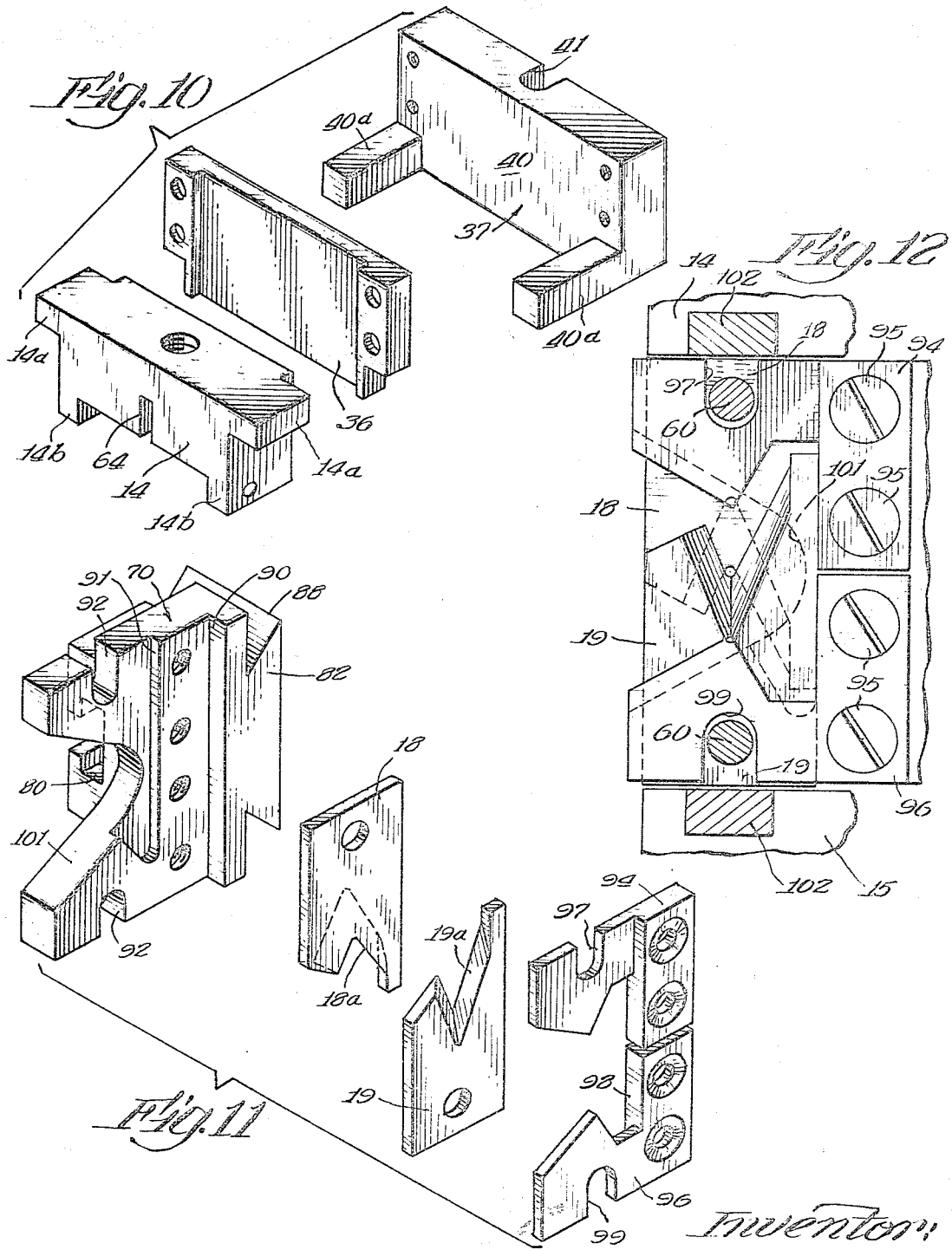

United States Patent Office 3,309,948
Patented Mar. 21, 1967

3,309,948
WIRE CUTTING AND STRIPPING APPARATUS ADJUSTABLE FOR SIZES AND LENGTHS OF WIRE TO BE STRIPPED
Henry R. Falken, Lancaster, Ohio, assignor to Essex Wire Corporation, Fort Wayne, Ind., a corporation of Michigan
Filed Jan. 10, 1966, Ser. No. 519,548
9 Claims. (Cl. 81—9.51)

This invention relates to wire cutting and stripping apparatus for automatically cutting insulated wire from a supply reel or the like into desired lengths and stripping the insulation from the ends thereof. More particularly, the invention is directed to improvements in the construction and operation of the wire-cutting and insulation-stripping blade mechanisms of such apparatus.

In one commonly used type of wire cutting and stripping machine, insulated wire is fed between a pair of simultaneously reciprocable cutter holders. Secured to each cutter holder is a central severing knife or wire cutter blade and a pair of insulation stripping knives or blades disposed at a distance to each side of the wire cutter blade equal to the length of the insulation to be stripped from the end of each length of wire. When the cutter holders are moved toward each other, the wire cutter blades completely sever the insulated wire while the stripper blades sever only the insulation. With the blades remaining in their cutting positions, wire gripping members withdraw the two portions of the cut wire in opposite directions away from the blades to strip the cut lengths of insulation from the wires.

While some of the prior machines of this type could be adjusted for stripping wires of different diameters and for varying the lengths of the insulation portions stripped from the wire ends, such adjustment was a time consuming operation that required the substitution of a number of parts, such as blade positioning members. With these prior cutting and stripping devices, it was necessary to maintain a stock of such positioning members to accommodate the many wire stripping variations required.

It is, therefore, an object of this invention to provide an improved wire cutting and stripping mechanism in which the insulation cutting stripper blades are easily, quickly and accurately adjustable relative to the wire cutting blades for determining the lengths of insulation to be removed from the wire.

Another object of this invention is to provide an improved adjustable wire cutting and stripping mechanism which may be easily, quickly and accurately adjusted for changes in the wire size.

A further object of this invention is to provide an improved wire cutting and stripping device having means thereon for adjusting the stripper blades relative to one another and to the cutter blades to vary the length of insulation removed from the wire and separate means for adjusting the stripper blades and cutting blades to accommodate different gauge wire, such adjustment means being independent one from the other. Other objects and advantages of this invention will become more apparent hereinafter.

The specific details of a preferred embodiment of the invention and their mode of functioning will be made most manifest and particularly pointed out in clear, exact and concise terms in conjunction with the accompanying drawings, wherein:

FIG. 1 is a schematic view illustrating diagrammatically a wire cutting and stripping machine known in the art, which machine can accommodate the wire cutting and stripping device of the present invention, with the blade holders in such device being positioned for receiving a length of insulated wire;

FIG. 2 is a schematic view similar to FIG. 1, illustrating the blade holders positioned for cutting both the insulation and the wire;

FIG. 3 is a schematic view similar to FIGS. 1 and 2 illustrating the lengths of wire being moved in opposite directions to remove the cut insulation from adjacent ends of the lengths of insulated wire;

FIG. 4 is a front view of the improved wire cutting and stripping device of the present invention;

FIG. 5 is an enlarged front detail view of the wire cutting and stripping device of FIG. 4, with parts broken away for clarity;

FIG. 6 is a cross-sectional view of the improved wire cutting and stripping device taken generally along line 6—6 of FIG. 4;

FIG. 7 is a side view of the improved wire cutting and stripping device, with parts broken away for clarity;

FIG. 8 is a cross-sectional view taken generally along line 8—8 of FIG. 4 and illustrating the coaction of the cutting blades;

FIG. 9 is a cross-sectional view taken generally along the line 9—9 of FIG. 7;

FIG. 10 is an exploded perspective view of a blade holder, stop block and guide;

FIG. 11 is an exploded view of a locater block assembly including a pair of stripper blades; and FIG. 12 is a cross-sectional view taken generally along line 12—12 of FIG. 4 and illustrating the coaction of a pair of stripper blades.

Referring to the drawings, the wire cutting and stripping machine illustrated diagrammatically in FIGS. 1–3 is of a well known type used for the cutting and stripping of insulated wire 10 having a conductor 11 covered by insulation 12. The insulated wire 10 is a continuous wire fed from a suitable source of supply such as a large spool by a wire feeding mechanism 13. The feeding mechanism 13 which is here illustrated as including a pair of driven rollers is operated intermittently to feed predetermined lengths of wire in advancing direction (from left to right in FIGS. 1–3) between a pair of blade holders 14 and 15 in the wire cutting and stripping device. The blade holders 14 and 15 are movable toward and away from each other and carry cooperating wire cutter blades 16 and 17, respectively, for completely severing the insulated wire 10. The blade holders 14 and 15 also carry cooperating pairs of insulation stripper blades 18, 19 and 20, 21 positioned on opposite sides of the blades 16 and 17 for cutting through the insulation 12 only of the wire 10. Adjacent the blade holders 14 and 15 but spaced therefrom along the path of wire feed is a pair of wire gripping members 22 and 23 which are each illustrated as including a pair of jaws movable to grip and release the wire 10. The wire gripping members 22 and 23 are each movable toward and away from the blade holders 14 and 15 along the path of wire feed.

At the beginning of an operating cycle of the machine shown in FIGS. 1–3, the blades and the wire gripping members will have opened as shown in FIG. 1 and a predetermined length of wire 10 will have been fed by the wire feeding mechanism through the blades and the wire gripping members. At this time, the wire gripping members 22 and 23 close to grip the wire 10 on opposite sides of the blades. The blade holders 14 and 15 are then actuated toward each other for carrying the blades into the cutting position shown in FIG. 2, wherein the wire cutter blades 16 and 17 completely sever the wire 10, and the insulation stripper blades 18, 19 and 20, 21 cut through only the insulation 12 of the wire 10. Thereafter, the wire gripping members 22 and 23 are moved apart from each other to withdraw the severed wire sections in opposite directions away from the still closed stripper blades 18, 19 and 20, 21. As the severed sections of insulation 12 are retained by the stripper blades as shown in FIG. 3, the insulation sections are stripped from the ends of the severed wire. The blade holders 14 and 15 are then returned to the position shown in FIG. 1 and the wire gripping members 22 and 23 are released from the wire 10. The cut and stripped length of wire and the severed sections of insulation are then removed from the cutting and stripping machine as the wire gripping members 22 and 23 return to the position shown in FIG. 1. Subsequently, the insulated wire 10 is again fed through the opened blades and wire gripping members and the cycle of operation is repeated.

According to the present invention, the stripper blades 18, 19 and 20, 21 are adjustably supported on the blade holders 14 and 15 in an improved wire cutting and stripping apparatus which is useful in the above described type of wire cutting and stripping machine. It will be understood, however, that the use of the wire cutting and stripping apparatus of this invention is not limited to machines of the particular type illustrated in FIGS. 1–3.

Referring now to FIGS. 4–7, the wire cutting and stripping apparatus of this invention includes a main frame 25 consisting of a vertical plate 26 having a rearwardly extending base 27 at its lower end and a stiffening flange 28 extending from the rear of the plate 26 to the base 27. The base 27 constitutes means for mounting the frame 25 on a suitable platform or frame of a wire cutting and stripping machine. The frame 25 also includes a pair of integral bracket arms 29 and 30 extending perpendicularly from the upper and lower ends of the front face 31 of the vertical plate 26.

A power unit in the form of a pneumatic power cylinder 32 mounted upon the upper bracket arm 29 has a piston rod 33 extending vertically downward through the arm 29. A similar pneumatic power cylinder 34 secured to the lower bracket arm 30 has a piston rod 35 extending vertically upward through the arm 30. The two blade holders 14 and 15 are suitably connected to the ends of the piston rods 33 and 35, respectively, and are guided on the frame means for sliding movement toward and away from one another. The blade holder 14 slides in a channel-like guide 36 secured to a stop block 37 by suitable fasteners, for example screws 120. The stop block 37 is adjustably mounted upon the front face 31 of the frame plate 26. The blade holder 15 likewise slides in a guide 38 carried by a stop block 39 which is adjustably mounted upon the face 31 of the plate 26.

As the stop blocks 37 and 39 are identical in construction, the same reference numerals are given to their like parts. Referring particularly to FIGS. 7, 9 and 10, the stop blocks 37 and 39 each have a rectangular body 40 provided with cutaway portions on its inner face forming a U-shaped channel 41 extending from one end of the body 40 to an enlarged socket or well 42 and a rectangular keyway 43 extending from the socket 42 to the other end. A key 44 fitted in a vertical keyway 45 in the frame front face 31 is received in the keyways 43 of the blocks 37 and 39 to provide alignment of the blocks with the frame 25 and to guide the blocks for movement toward and away from one another.

The blocks 37 and 39 are vertically movable relative to the frame plate 26 by virtue of adjusting screws 46 and 47 threaded through the bracket arms 29 and 30 of the frame 25. The adjusting screws each have a neck portion 48 entering the channel 41 of its respective block and an enlarged head 49 received in the corresponding socket 42. The free ends of the adjusting screws 46 and 47 are each provided with a screwdriver slot or other suitable means permitting rotation of each adjusting screw to lower or raise the respective stop block 37 or 39. Set screws 51 passing through elongated slots 52 in the frame plate 26 are threaded into the stop block bodies 40 to lock the stop blocks 37 and 39 in any desired position.

The projections 14a and 15a on the blade holders 14 and 15 are adapted to abut the arms 40a extending at right angles from the bodies 40 of the stop blocks 37 and 39 to limit the movement of the blade holders 14 and 15 toward one another so as to adjust the blades carried therewith for different gauges of insulated wire.

Referring to FIGS. 4–8, 11 and 12, the blade holder 14 carries the stripper blades 18 and 20 and the cutting blade 16 for longitudinal movement on frame means 25. The blade holder 15 carries the stripper blades 19 and 21 and the cutting blade 17 for longitudinal movement on frame means 25. Each blade in blade holder 14 is provided with a hole or opening therein for receiving a pin or shaft 60 which is secured at its ends by set screws 61 in extended flange portions 14b of the blade holder 14. Similarly, the stripper blades 19 and 21 and the cutting blade 17 are provided with openings for receiving the pin or shaft 60 which is secured at its ends by set screws 61 in the extended flange portions 15b of blade holder 15. The cutting blades are longer than the stripper blades and the elongated ends of the blades are received in recesses 64 in the blade holders 14 and 15. Spacer 65 is disposed in each recess 64 adjacent a cutting blade 16, 17 to maintain desired positioning and alignment of the cutting blades 16 and 17 with respect to one another.

In FIGS. 7, 11 and 12, there is shown the construction of the locater blocks and the stripper blades affixed thereto. Each locater block 70 includes a wedge-shaped base 82 having inwardly tapering and converging surfaces which are adapted to engage with and slide upon slide bars 84 which are secured to the slide block or slide base 86 by means of screws 85. The side 88 of locater block 70 slides along the surface 89 of the slide block 86. The outer end of the locater block 70 is provided with a T-shaped recess 80 for receiving the head 75 of the adjustment screw 74. The inner surface of the block is stepped as indicated at 90 and 91.

Each pin member 60 is adapted to extend through the opening in the stripper blade 18 and to be moved upwardly from the locater blocks 70 in the U-shaped recesses 92 provided in the upper and lower surfaces thereof. The inner surface of the stripper blade 18 is adapted to slide on the stepped surface 91 (FIG. 11). The stripper blade 18 is retained in position on the locater block 70 by means of the blade mounting 94 which has openings through which fastening screws may pass, such fastening screws being affixed to the threaded openings in the locater block 70.

Similarly, the stripper blade 19 is slidably carried on the locater block 70 between the locater block and the blade support 96. The blade support or mounting is provided with a planar surface 98 upon which the inner surface of the stripper blade 19 may ride. The blade supports 94 and 96 are each provided with U-shaped recesses 97 and 99, respectively, for permitting movement of the supporting pins 60 toward and away from one another to permit cutting and stripping of an insulated blade. The outer surface of the locater block 70 is deeply recessed as indicated at 101 to permit passage of the insulated wire therethrough so that the wire may be acted upon by the cutting blades and the stripper blades.

The blades 18 and 19 slide one upon the other and are guided for movement toward and away from one another along the surface 91 on the locater block 70 and the surface 98 on the blade support 96. The knife edges 18a and 19a respectively, are sloped toward one another so as to effect a sharp shearing or cutting of the insulation from the insulated wire. The cutting surfaces are generally V-shaped, as best seen in FIGS. 11 and 12, for accurately positioning the wire between the two cooperating stripper blades.

As seen in FIGS. 6 and 12, machine screws 95 are employed to affix the blade supports 94 and 96 to the respective locater blocks 70. The stripper blades 18 and 19 are adapted to abut hardened backup plates 102 carried on the blade holders.

Referring to FIGS. 5, 6 and 8, there is best illustrated the cooperation of the cutting blades 16 and 17. The pins 60 pass through the openings in the cutting blades 16 and 17 for supporting the cutting blades on the blade holders 14 and 15 for movement therewith. The cooperating cutting edges of the cutting blades 16 and 17 are V-shaped and are adapted to overlap one another to effect a cutting of the insulated wire, including both the insulation 12 and the wire 11. The cutting blades 16 and 17 are elongated and the ends extend into recesses 64 provided in the blade holders 14 and 15, respectively. Spacers 65 are provided in each of the recesses for maintaining alignment of the cutting blades 16 and 17. Thus, the cutting blades are fixed on the blade holders against transverse movement with respect to the axis of movement of the blade holders.

In FIGS. 4, 5, 6, 7 and 11, there is shown the construction for adjusting the length of insulation stripped from the end of each length of insulated wire. The stripper blades 18, 19 and 20, 21, respectively, are carried on locater blocks 70 which are selectively movable toward and away from each other and from the cutting blades transversely of the frame 25. The adjustment screws 74 are threadedly engaged in the adjustment blocks 76 and upon release of the lock nuts 78, the knurled heads 73 of the adjustment screws 74 may be rotated selectively to move the locater blocks 70 toward or away from one another and from the cutter blades to adjust the length of insulation stripped from a segment of insulated wire. Each end of the wire 10 can be stripped a different length since the screws 74 operate independently from one another. The enlarged inner end 75 of each adjustment screw 74 is adapted to be rotatably supported in a T-shaped recess 80 provided in each locater block 70. The adjustment blocks 76 are suitably affixed to frame means 25 as for example, by screw means 81.

It will be understood that as the locater blocks 70 are moved toward and away from one another and from the cutting blades to adjust the length of insulation stripped from the section of insulated wire, the indvidual stripper blades will be moved on the pin members 60. Thus, when the blade holders 14 and 15 are moved toward one another, the stripping blades will cooperate to sever a length of insulation to be stripped and the cutting blades 16 and 17 will sever the wire 11, as best shown in FIGS. 5 and 6.

The operation of the wire cutting and stripping apparatus of the present invention is believed clear from the foregoing and, therefore, the operation will be only summarized hereafter. Essentially, the present invention provides an improved wire cutting and stripping apparatus having means for adjusting the length of insulation to be stripped from the end of an insulated wire. The apparatus is also adjustable to accommodate insulated wire of different gauges. The adjustment features of the present invention are expedient and are easily made in a minimum of time. To accommodate a predetermined gauge of insulated wire, the set screws 51 are loosened and the stop blocks 37 and 39 may be moved toward or away from one another by rotation of the adjustment screws 46 and 47. The heads of screws 51 are movable in slot 52. Positioning of the stop blocks will effectively shorten or length the stroke of the power cylinders 32 and 34 to adjust the cutting depth of the opposed pairs of stripper blades carried by the blade holders. After the stop blocks have been adjusted to predetermined positions, the adjustment screws 51 may be locked to securely hold the blade holder bodies 40 in place on the frame 25.

The length of wire insulation stripped from the ends of a length of insulated wire is varied by adjusting the screws 74 to move the locater blocks 70 toward and away from one another and from the cutting blades. If, for example, it is desired to strip more insulation from the end of a given length of wire, then the stripper blades must be moved further away from the cutting blades. As the cutting blades 16 and 17 each engage within a recess 64 in the blade holders 14 and 15, there is no transverse movement of the cutting blades. The stripper blades, however, are supported on the locater blocks 70 which are adjustable toward and away from one another by means of adjustment screw 74. Thus, to strip a greater length of insulation from a wire, the lock nut 78 is released and the adjustment screws 74 are rotated to move the locater block 70 along the slides 84 and the slide block 86 away from the cutting blades. The openings in the cutting blades and stripper blades permit the blades to slide transversely of the blade holders on the pins 60.

To cut a length of wire and strip the insulation from the ends thereof, a predetermined length of wire is passed through the wire cutting and stripping device. Power cylinders 32 and 34 are actuated to move the blade holders 14 and 15 toward one another. Movement of the blade holders toward one another is limited by stop blocks 37 and 39. The cutting blades 16 and 17 pass through the wire to sever same and the stripping cutters 18, 19 and 20, 21, respectively, cut through the insulation 12 to the exterior surface of the wire 11, without cutting the wire 11. The ends of the insulated wire are then pulled away from one another to strip the predetermined length of cut insulation from the ends of the wire. The power cylinders 32 and 34 are then actuated to move the blade holders 14 and 15 away from one another preparatory to receiving another predetermined length of wire to be cut and stripped.

There has been provided by the present invention a novel wire cutting and stripping apparatus by which adjustments for length of insulation stripped and for different gauges of wire may be easily, quickly and accurately accomplished. The two adjustments are separate from one another and thus the adjustment of the wire cutting and stripping device to accommodate a predetermined gauge of insulated wire will not effect the stripping adjustment for removing a predetermined length of insulation.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. Wire cutting and stripping apparatus comprising frame means, a pair of blade holders on said frame means movable toward and away from one another, first, second and third blade means on each of said blade holders, the blade means on one blade holder cooperating with the respective blade means on the other blade holder for performing selected operations on insulated wire, said first cooperating blade means and said third cooperating blade means being supported on said blade holders for cutting the insulation without cutting the wire, said second cooperating blade means being supported on said blade holders for severing the wire, first means for adjusting the blade holders with respect to one another to vary the relative movement of the first and third blade means to accommodate insulated wire of different dimensions, and second means for adjusting the transverse positions of the first and third blade means relative to the second blade means to vary the length of insulation stripped from a wire.

2. Wire cutting and stripping apparatus as in claim 1 wherein said blade holders are supported for linear movement toward and away from one another on stop blocks carried on the frame means, said first means comprising rotatable means operatively connection each of said stop blocks and said frame means, whereby rotation of the rotatable means will reposition the stop blocks with respect to one another to adjust the movement of the blade holders toward one another and thereby adjust the cutting movement of the blade means, and power means for moving said blade holders between a first position for receiving insulated wire to be cut and stripped, and a second position wherein the second blade means are operative to cut a length of wire and said first and third blade means are operative to cut only the insulation for stripping predetermined lengths of insulation from the ends of adjacent pieces of insulated wire.

3. Wire cutting and stripping apparatus as in claim 2 wherein said stop blocks are supported on said frame means along a guide member for reciprocal movement toward and away from one another, each blade holder and adjacent stop block having cooperating means thereon for limiting movement of the blade holders toward one another, each rotatable means comprising a screw member, the adjustment of the stop blocks limiting the movement of the blade holders toward one another to adjust the spacing between the first and third blade means so as to accommodate insulated wire of different gauge.

4. Wire cutting and stripping apparatus as in claim 3 wherein each stop block includes arm means extending therefrom, and said blade holders each having flange means extending therefrom, the flange means on the blade holders being adapted to abut the arm means on the stop blocks to limit movement of the blade holders toward one another.

5. Wire cutting and stripping apparatus as in claim 1 wherein said second means for adjusting the transverse positions of the first and third blade means include locater block means on said frame means guided for linear movement toward and away from said second blade means, said first and third blade means being slidably guided on said locater block means for movement transverse thereto and being operatively connected to said blade holders for movement therewith.

6. Wire cutting and stripping apparatus as in claim 5 wherein said first and third blade means comprise opposed pairs of stripper blades, each blade having a hole therein for receiving a pin affixed to a blade holder, whereby upon movement of said locater block means, the opposed pairs of stripper blades will slide on the pins to permit adjustment of the length of insulation stripped from the end of a length of insulated wire without effecting the adjustment of the blade holders for different gauge wire.

7. Wire cutting and stripping apparatus as in claim 5 wherein said locater block means are slidable in a guideway on the frame means that is at right angles to the line of movement of the blade holders and the means for adjusting the position of the locater block means relative to one another includes screw means operatively connected between the frame means and the locater block means.

8. Wire cutting and stripping apparatus as in claim 1 wherein each blade holder has a pair of flange portions extending therefrom and defining a recess therebetween, a pin member connected to said flange portions of each blade holder and disposed in said recess in each blade holder, the first and third blade means on each blade holder having a hole therein for receiving a pin member whereby the blade means on a blade holder are carried for movement with respect to the blade means on the other blade holder, the first and third blade means of each blade holder being slidable on the associated pin member longitudinally of the pin member for adjusting the positions of the first and third blade means with respect to the second blade means.

9. Wire cutting and stripping apparatus as in claim 8 wherein a guideway is provided on the frame means, said guideway, being disposed transversely of the line of travel of the blade holders, a pair of locater block assemblies slidable in the guideway for movement toward and away from one another, adjustment means for adjusting the positions of the locater blocks in the guideway, said first blade means being slidably supported by one locater block assembly and the third blade means being slidably supported by the other locater block assembly, the adjustment of each of said locater block assemblies causing the blade means carried therewith to slide along their respective pin members to adjust the spacing between the second blade means and the first and third blade means, respectively, so as to adjust the length of insulation stripped from the end of a length of insulated wire.

References Cited by the Examiner
UNITED STATES PATENTS

| 2,497,112 | 2/1950 | Andren | 81—9.51 |
| 2,680,394 | 6/1954 | Andren | 81—9.51 |
| 2,718,802 | 9/1955 | Cook | 81—9.51 |
| 2,818,756 | 1/1958 | Moeller | 81—9.51 |
| 3,019,679 | 2/1962 | Schwalm et al. | 81—9.51 |

WILLIAM FELDMAN, *Primary Examiner.*

MILTON S. MEHR, *Examiner.*